United States Patent [19]

Wang

[11] Patent Number: 4,753,986

[45] Date of Patent: Jun. 28, 1988

[54] POLYESTER COMPOSITIONS HAVING HIGH IMPACT STRENGTH

[75] Inventor: I-Chung W. Wang, Clifton Park, N.Y.

[73] Assignee: General Electric Company, Schenectady, N.Y.

[21] Appl. No.: 944,725

[22] Filed: Dec. 22, 1986

[51] Int. Cl.[4] ............................................. C08L 67/02
[52] U.S. Cl. ........................................ 525/64; 525/68
[58] Field of Search .................................... 525/64, 68

[56] References Cited

U.S. PATENT DOCUMENTS

| | | | |
|---|---|---|---|
| 3,600,465 | 8/1971 | Knapp | 525/316 |
| 4,034,013 | 7/1977 | Lane | 525/64 |
| 4,180,494 | 12/1979 | Fromuth et al. | 525/63 |
| 4,292,233 | 9/1981 | Binsack | 525/69 |
| 4,417,026 | 11/1983 | Lindner et al. | 525/64 |
| 4,535,124 | 8/1985 | Binsack | 525/67 |

FOREIGN PATENT DOCUMENTS 1176390 10/1984 Canada.
1247665 8/1967 Fed. Rep. of Germany.
1269360 3/1968 Fed. Rep. of Germany.

*Primary Examiner*—Patricia Short
*Attorney, Agent, or Firm*—Williasm H. Pittman; James C. Davis, Jr.; James Magee, Jr.

[57] ABSTRACT

The impact strengths of linear polyesters such as poly(ethylene terephthalate) and poly(1,4-butylene terephthalate) are improved, particularly at low temperatures, by the incorporation therein of a core-shell impact modifier. The core therein is a crosslinked elastomeric polymer of at least one conjugated diene such as butadiene and has a volume average particle size in the range of about 90–700 nanometers. The grafted shell is a copolymer of at least one vinyl aromatic compound such as styrene and at least one polymerizable nitrile such as acrylonitrile.

7 Claims, No Drawings

POLYESTER COMPOSITIONS HAVING HIGH IMPACT STRENGTH

This invention relates to polyester resin blends having improved impact properties, particularly at low temperatures.

Linear polyesters such as polyethylene terephthalate and polybutylene terephthalate are in wide use as engineering resins because of their high solvent resistance, thermal and dimensional stability and low moisture absorption. In order to produce molded polyester articles of high impact resistance, however, it has been necessary to blend the polyesters with other resins having good impact properties, such as polycarbonates.

The blends thus obtained are themselves deficient in certain applications. For example, polyester-polycarbonate blends have excellent impact properties at ambient temperatures but their impact resistance decreases substantially at lower temperatures. Moreover, such blends tend to undergo ester-carbonate interchange which results in degradation and randomization of the polymer chains, with a resulting deleterious effect on physical properties.

Various elastomeric impact modifiers have also been added to linear polyesters. These include core-shell copolymers comprising particles with a rubbery core surrounded by a relatively rigid shell. For example, U.S. Pat. No. 4,034,013 describes blends of polyester with a multiple stage polymer having a rubbery first stage and an epoxy-functional hard final stage, and U.S. Pat. No. 4,417,026 describes the use of a core-shell copolymer with a highly crosslinked diene rubber core and two shells grafted thereon. In U.S. Pat. No. 4,180,494, there are described polyester-polycarbonate blends with a butadiene-based core-shell impact modifier. These compositions still leave something to be desired in the area of low temperature impact strength.

The low temperature problem is specifically addressed in U.S. Pat. No. 4,535,124. It describes blends of polyalkylene terephthalate with a core-shell impact modifier having a bimodal rubber particle size distribution. It will be apparent to those skilled in the art, however, that such bimodal materials are somewhat more troublesome and expensive to make and use than ordinary core-shell materials. Moreover, the low-temperature impact strengths of the compositions thus obtained still leave a good deal to be desired; the maximum notched Izod impact strength at $-40°$ C. disclosed in that patent is 203.2 joules/m., which is not an outstandingly high figure.

The above-described core-shell copolymers are only a small subgenus of the known types. Many such copolymers having diene- and/or acrylate-based elastomeric cores and predominantly acrylate- and/or methacrylate-based shells are disclosed in the patent literature and are commercially available. They are primarily tailored to provide optimum properties in blends with polyvinyl chloride and similar halogen-containing resins.

The present invention provides linear polyester compositions with very high impact strengths, both at atmospheric and low temperatures. The characteristic feature of these compositions is the presence of a coreshell impact modifier comprising a rubbery core having a unimodal particle size distribution, with certain critical limitations on particle size range, and a shell prepared from monomers of a specific subgenus.

The invention is directed to a resinous composition comprising a major proportion of at least one linear polyester and a minor proportion, effective to improve impact strength, of a grafted core-shell impact modifier copolymer in the form of particles which comprise:

a core of a crosslinked elastomeric polymer of at least one conjugated diene, the particle size of said core being substantially uniform and the volume average particle size being in the range of about 90–700 nanometers; and a shell grafted thereon which is a copolymer of monovinyl monomers which consist essentially of at least one vinyl aromatic compound and at least one polymerizable nitrile.

The linear polyesters in the resinous compositions of this invention usually comprise structural units of the formula

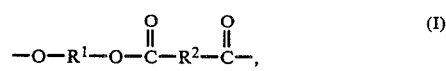

wherein each of $R^1$ and $R^2$ is a divalent aliphatic, alicyclic or aromatic radical containing about 2–10 carbon atoms. At least about 30 of said units are usually present, with at least about 50 being preferred. Such linear polyesters are typically prepared by the known reaction of dihydroxy compounds with dicarboxylic acids or functional derivatives thereof such as anhydrides, acid chlorides or lower alkyl (especially methyl) esters, preferably the esters.

The $R^1$ radicals may be one or more aliphatic, alicyclic or aromatic radicals, alicyclic radicals being known to those skilled in the art to be equivalent to aliphatic radicals for the purposes of the invention. They may be derived from such dihydroxy compounds as ethylene glycol, 1,4-butanediol (both of which are preferred), propylene glycol, 1,3-propanediol, 1,6-hexanediol, 1,10decanediol, 1,4-cyclohexanedimethanol, 2-butene-1,4-diol, resorcinol, hydroquinone and bisphenol A. They may also be radicals containing substituents which do not substantially alter the reactivity of the dihydroxy compound (e.g., alkoxy, halo, nitrile) or hetero atoms (e.g., oxygen or sulfur).

The $R^2$ radicals may be derived from such acids as succinic, adipic, maleic, isophthalic and terephthalic acids or similar substituted and hetero atom-containing acids. It usually contains about 6–10 carbon atoms.

Most often, $R^1$ and $R^2$ are hydrocarbon radicals. Preferably, $R^1$ is aliphatic and especially saturated aliphatic and $R^2$ is aromatic. The polyester is most desirably a poly(alkylene terephthalate), particularly poly(ethylene terephthalate) or poly(1, 4-butylene terephthalate) (hereinafter sometimes simply "polyethylene terephthalate" and "polybutylene terephthalate", respectively) and especially the latter. Such polyesters are known in the art as illustrated by the following patents:

| | |
|---|---|
| 2,465,319 | 3,047,539 |
| 2,720,502 | 3,671,487 |
| 2,727,881 | 3,953,394 |
| 2,822,348 | 4,128,526. |

The polyesters preferably have number average molecular weights in the range of about 10,000–70,000, as determined by gel permeation chromatography or by intrinsic viscosity (IV) at 30° C. in a mixture of 60% (by weight) phenol and 40% 1,1,2,2-tetrachloroethane.

An essential feature of the present invention is the identity of the core-shell impact modifier copolymer. The core is a crosslinked elastomeric polymer of at least one conjugated diene such as butadiene, isoprene or chloroprene, with butadiene being preferred.

Crosslinking of the core particles is necessary to minimize deformation as a result of shearing forces and the like. It may be an inherent result of the presence of pendant olefinic groups as a result of polymerization in part by 1,2-addition. Further polymerization of such groups gives rise to linkages between polymer chains. Thus, it is within the scope of the invention for the core to be substantially homopolymeric polybutadiene or the like, the word "substantially" being required by reason of the existence of core-shell grafting.

It is also within the scope of the invention to incorporate a relatively small amount (typically about 1–2 percent by weight) of a crosslinking monomer in the polymerizing diene composition, thus producing a copolymer. Illustrative crosslinking monomers are divinylbenzene, ethylene glycol dimethacrylate and trimethylolpropane trimethacrylate, with divinylbenzene being preferred. The divinylbenzene generally employed is a commercial grade which may comprise only about 40–60% by weight divinylbenzene, with the balance being impurities commonly found in such commercial materials.

The particle size of the elastomeric core is of particular importance. It should be substantially uniform, which means in the context of this invention that the particle size distribution, when expressed in terms of a Gaussian curve, should have a standard deviation no higher then about 60%. Preferably, the standard deviation is no higher than about 40%.

The actual volume average particle size is in the range of about 90–700 nanometers, as determined by laser light scattering. For optimum low temperature impact strength, the preferred average particle size range is about 110–350 nanometers, with about 120–310 nanometers being particularly preferred and about 140–270 nanometers being most preferred.

The shell of the impact modifier copolymer is a copolymer of monovinyl monomers including at least one vinyl aromatic compound and at least one polymerizable nitrile. Illustrative compounds of these types include styrene, α-methylstyrene, chlorostyrene, vinyltoluene, acrylonitrile and methacrylonitrile. Styrene and acrylonitrile are preferred.

An important aspect of the invention is the discovery of improved impact modification by using copolymers containing a shell consisting essentially of units as described above. Such copolymers are superior in the present context to those in which the shell is derived from ester monomers such as methyl methacrylate. Thus, the shell of the impact modifier is best defined as being substantially (as defined hereinabove) a copolymer of a vinyl aromatic compound such as sytrene and a polymerizable nitrile such as acrylonitrile.

The weight ratio of core to shell is not a critical aspect of the invention. However, it is generally in the range of about 1.5–5.5:1, and preferably about 2.2–3.3:1.

The preparation of the impact modifier copolymer may be achieved by methods known in the art. Initially, the diene and any other precursors of the elastomeric core are polymerized in aqueous emulsion in the presence of at least one free radical initiator and at least one basic emulsifier. Suitable emulsifiers and initiators are known in the art. The desired particle size is attained by subsequently inactivating the emulsifier, typically by addition of an acidic reagent such as a mineral acid or a fairly strong carboxylic acid such as acetic acid. The proportion of acid which should be employed for a specific particle size may readily be determined by simple calibration. Inactivation of the emulsifier causes agglomeration of the crosslinked elastomeric particles.

Following agglomeration, the particles are coated with further emulsifier and the shell precursor monomers are added and polymerized in known fashion. This polymerization step is normally effected in a weakly basic system. The core-shell impact modifier is obtained as a latex and may be isolated therefrom by conventional coagulation means.

The proportion of impact modifier copolymer in the compositions of this invention is not critical, provided it is effective to improve impact strength. In general, said proportion is about 5–40% by weight.

The preparation of suitable core-shell impact modifier copolymers is illustrated by the following examples. All parts in this and other examples herein are by weight.

EXAMPLE 1

A mixture of 175 parts of butadiene, 2.5 parts of sodium pyrophosphate, 0.05 part of ferrous sulfate, 1 part of glucose, 4 parts of sodium oleate as emulsifier, 200 parts of water and 0.3 part of cumene hydroperoxide was stirred at 30° C. over 17 hours and then at 50° C. for 2 hours. The resulting elastomeric latex had a volume average particle size of about 80 nm. It was diluted with water and a mixture of ice and acetic anhydride was added in an amount to agglomerate the emulsion to the desired particle size. Two parts of "GAFAC RE-610", a commercially available phosphate ester emulsifier, was added to coat the surfaces of the particles, after which the pH of the system was adjusted to a value in the range of 8–10.

The emulsion was filtered through cheesecloth and 75 parts of a 3:1 mixture of styrene and acrylonitrile was added over 2 hours at 65° C, with stirring. There was concurrently added an additional 0.38 part of cumene hydroperoxide and 0.19 part of sodium formaldehyde sulfoxylate. Following addition of the shell monomers, 1.75 parts of 2,6-di-t-butylphenol was added in aqueous emulsion as a stabilizer. The resulting composition was again filtered through cheesecloth and the polymer was isolated by coagulation with aqueous magnesium sulfate solution at 80°-85° C. and dried in an oven. The resulting core-shell copolymer was obtained in the form of a free-flowing powder.

EXAMPLE 2

The procedure of Example 1 was repeated, except that the initial polymerization mixture also contained 3.5 parts of commercial divinylbenzene (2% divinylbenzene based on butadiene). A similar core-shell copolymer was obtained.

EXAMPLE 3

The procedure of Example 2 was repeated, except that the styrene-acrylonitrile mixture also contained commercial divinylbenzene in the amount of 1% divinylbenzene based on styrene and acrylonitrile. A similar core-shell polymer was obtained.

The core-shell impact modifier is present in the compositions of this invention in an amount effective to improve impact strength, at ambient temperatures (i.e., about 25° C.) and preferably also at low temperatures (i.e., about −30° to −40° C.). This amount is most often about 5–40% of resinous components, by weight.

The compositions may be prepared by known blending methods, including dry blending, melt blending (as by extrusion) and solution blending. They are particularly useful for the preparation of molded articles by known molding techniques, particularly injection molding. Said compositions may also contain non-resinous materials, particularly fillers and reinforcing materials such as glass fibers.

The preparation and properties of the compositions of this invention are illustrated by the following examples. All divinylbenzene proportions are expressed in terms of the actual divinylbenzene content of the commercial grade material.

EXAMPLE 4

Blends of polybutylene terephthalate having a number average molecular weight of about 45,000 and 20% by weight of various core-shell copolymers prepared as described in Examples 1 and 2 were prepared by extrusion at 245–255° C., granulation and drying. They were injection molded into notched Izod impact bars and tested for impact strength according to ASTM procedure D256. The relevant parameters and test results are given in Table I. The control was a commercially available core-shell copolymer containing a butadiene core and a styrene-methyl methacrylate shell.

TABLE I

| Identity | Core-shell copolymer Core particle size, nm. | Core/shell wt. ratio | Izod impact strength, joules/m. 23° C. | −30° C. | −40° C. |
|---|---|---|---|---|---|
| Ex. 1 | 80 | 2.33:1 | 96 | — | — |
| Ex. 1 | 95 | 2.57:1 | NB* | 338 | 207 |
| Ex. 1 | 140 | 2.33:1 | NB | — | 380 |
| Ex. 1 | 148 | 2.39:1 | NB | 935 | 808 |
| Ex. 1 | 164 | 2.33:1 | NB | — | 955 |
| Ex. 1 | 201 | 2.64:1 | NB | 1116 | 1092 |
| Ex. 2 | 210 | 2.33:1 | NB | — | 952 |
| Ex. 1 | 255 | 2.64:1 | NB | 1040 | 964 |
| Ex. 1 | 255 | 3.29:1 | NB | 903 | 863 |
| Ex. 1 | 307 | 2.33:1 | NB | 687 | 412 |
| Ex. 2 | 435 | 2.33:1 | NB | — | 255 |
| Ex. 1 | 556 | 2.23:1 | NB | — | 427 |
| Ex. 1 | 630 | 2.33:1 | NB | — | 278 |
| Control | — | — | NB | — | 239 |

*No break.

EXAMPLE 5

The procedure of Example 4 was repeated, using several additional core-shell copolymers prepared substantially as described in Examples 1–3. The relative parameters and results are listed in Table II. Control A was identical to the control in Example 4, and control B was a core-shell copolymer with a butadiene-divinylbenzene core and a methyl methacrylate-divinylbenzene shell. All samples were "no break" at 23° C.

TABLE II

| Identity | Core particle size, nm. | Core/shell wt. ratio | Izod impact strength joules/m. −30° C. | −40° C. |
|---|---|---|---|---|
| Ex. 1 | 243 | 2.38:1 | — | 700 |
| Ex. 2* | 206 | 2.39:1 | — | 821 |
| Ex. 2* | 220 | 2.40:1 | — | 879 |
| Control A | — | — | — | 249 |
| Control B | 215 | 2.42:1 | 74 | 74 |

*1% divinylbenzene.

What is claimed is:

1. A resinous composition comprising a major proportion of poly(1,4-butylene terephthalate) and about 5–40% of said composition of a grafted core-shell impact modifier copolymer in the form of particles which comprise:
   a core of a crosslinked, acid-agglomerated elastomeric polymer of at least one conjugated diene, the particle size of said core being substantially uniform and the volume average particle size being in the range of about 120–310 nanometers; and
   a shell grafted thereon which is a copolymer of monovinyl monomers which consist essentially of at least one vinyl aromatic compound and at least one polymerizable nitrile.

2. A composition according to claim 1 wherein the shell of the impact modifier is substantially a copolymer of styrene and acrylonitrile.

3. A composition according to claim 2 wherein the weight ratio of core to shell in the impact modifier copolymer is in the range of about 1.5–5.5:1.

4. A composition according to claim 3 wherein the impact modifier copolymer has a core with a volume average particle size in the range of about 140–270 nanometers.

5. A composition according to claim 4 wherein the core of the impact modifier copolymer is substantially a homopolymeric butadiene core.

6. A composition according to claim 4 wherein the core of the impact modifier copolymer is substantially a copolymer of butadiene with about 1–2% by weight of a crosslinking monomer.

7. A composition according to claim 6 wherein the crosslinking monomer is divinylbenzene.

* * * * *